United States Patent [19] | [11] | 4,444,920 |
|---|---|---|
| Brennan | [45] | Apr. 24, 1984 |

[54] AROMATIC POLYOLS MADE FROM ALKYLENE GLYCOLS AND WASTE STREAMS FROM THE MANUFACTURE OF DIMETHYL TEREPHTHALATE CONTAINING METHYL P-FORMYLBENZOATE

[75] Inventor: Michael E. Brennan, Austin, Tex.

[73] Assignee: Texaco Inc., White Plains, N.Y.

[21] Appl. No.: 476,457

[22] Filed: Mar. 18, 1983

[51] Int. Cl.$^3$ .................. C08G 18/14; C08G 18/32; C08G 18/66; C09K 3/00

[52] U.S. Cl. .................. 521/173; 521/128; 521/129; 521/124; 521/126; 521/127; 521/167; 521/172; 252/182

[58] Field of Search ............... 252/182; 521/167, 172, 521/173

[56] References Cited

U.S. PATENT DOCUMENTS

| 3,297,597 | 1/1967 | Edwards et al. | 521/164 |
|---|---|---|---|
| 3,647,759 | 3/1972 | Walker | 528/305 |
| 3,892,796 | 7/1975 | Leibfried | 521/172 |
| 4,048,104 | 9/1977 | Svoboda et al. | 521/173 |
| 4,137,265 | 1/1979 | Edwards et al. | 521/167 |
| 4,223,068 | 9/1980 | Carlstrom et al. | 521/172 |
| 4,237,238 | 12/1980 | DeGuiseppi et al. | 521/902 |
| 4,246,365 | 1/1981 | Wiedermann et al. | 528/80 |
| 4,346,229 | 8/1982 | Derr et al. | 521/172 |
| 4,394,286 | 7/1983 | Millick | 528/83 |

OTHER PUBLICATIONS

DuPont Data Sheet–DMT–HBR Preliminary Information–Petrochemicals Department, Intermediates Division.

*Primary Examiner*—H. S. Cockeram
*Attorney, Agent, or Firm*—Robert A. Kulason; Jack H. Park; David L. Mossman

[57] ABSTRACT

Mixtures of aromatic polyols containing ester functionalities suitable for use in rigid foams prepared by reacting a dimethyl terephthalate waste stream containing methyl p-formylbenzoate over a metal alkoxide catalyst and subsequently transesterifying the product with a polyalkylene glycol in the presence of heat are described. These novel polyols may be blended with conventional polyols to yield excellent rigid foams, thus serving as useful polyol extenders. These low hydroxyl number extender polyols unexpectedly have a low relative viscosity.

19 Claims, No Drawings

AROMATIC POLYOLS MADE FROM ALKYLENE GLYCOLS AND WASTE STREAMS FROM THE MANUFACTURE OF DIMETHYL TEREPHTHALATE CONTAINING METHYL P-FORMYLBENZOATE

BACKGROUND OF THE INVENTION

1. Field of the Invention

The invention relates to polyols for rigid polyurethane foams and more particularly relates to such aromatic polyester polyols which are made from the waste streams of dimethyl terephthalate manufacture containing methyl p-formylbenzoate and alkylene glycols.

2. Description of Other Relevant Compounds in the Field

It is known to prepare polyurethane foam by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of modified polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate (DMT) with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue ) is described in U.S. Pat. No. 3,647,759. J. M. Hughes and John Clinton, in the Proceedings of the S.P.I. 25th Annular Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having hydroxyl and ester functionalities for use in preparing rigid foams, being produced by the process comprising reacting a dimethyl terephthalate waste stream which contains from about 40 to 60 mole percent of methyl p-formyl benzoate over a metal alkoxide catalyst and subsequently transesterifying the resulting product with a polyalkylene glycol by applying heat in the range from about 150° to 250° C.

DETAILED DESCRIPTION OF THE PREFERRED EMBODIMENTS

In general, it has been discovered that rigid foams may be made using the mixture of aromatic polyester polyols of this invention as polyol extenders together with other polyols. In addition, such a polyol mixture is compatible with the trichlorofluormethane blowing agent.

The novel aromatic polyester polyol mixtures are made by using a dimethyl terephthalate (DMT) waste stream. This may be any waste stream from the manufacture of dimethyl terephthalate. The waste stream must contain compounds which have the moieties

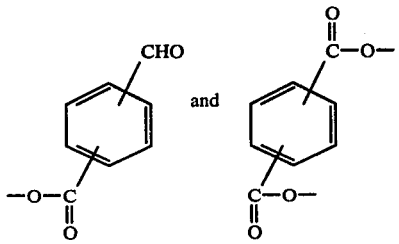

One requirement for the content of the waste stream is that a substantial proportion be an alkyl p-formylbenzoate such as methyl p-formylbenzoate (MFB). The portion of alkyl p-formylbenzoate should range from about 40 to 60 mole percent of the DMT waste stream. These DMT waste streams may also contain DMT substituted benzenes and benzyl esters of the toluate family. Dimethyl terephthalate may be present in amounts ranging from 6 to 60% of the DMT waste stream. These waste streams are generally taken off overhead.

It may be seen from the discussion above that these waste streams are actually a mixture of different compounds. In order to prepare the inventive aromatic polyester polyol, the components must be reacted together in the first step by contacting the residue with a metal alkoxide catalyst. The metal in the catalyst may be selected from the group consisting of Groups IA and IIIA of the Periodic Table. Specific metal found useful (and which are preferred) include sodium and aluminum. The alkyl group on the metal alkoxide catalyst should have from one to four carbon atoms. Particular examples are sodium methoxide and aluminum ethoxide. The level of the catalyst in the reaction ranges from 1 to 10 weight percent. The catalyst should be dissolved or suspended in an alcoholic solvent such as methanol, which is preferred.

The first step may be conducted under relatively mild conditions such as a temperature range between about 25° to 65° C. (reflux temperature of methanol).

The second step involves the reaction of the product of the first step with one or more alkylene glycols, present in a product stream or even as a residue from glycol manufacturing. This process is known as transesterification.

Preferably, the alkylene glycol has the formula

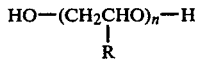

where R is hydrogen or lower alkyl of one to four carbon atoms and n is from 1 to 10. Glycols which meet this definition are ethylene glycol, propylene glycol (1,2-propylene glycol), diethylene glycol (DEG), dipropylene glycol, and triethylene glycol (TEG), among others.

The second step may take place with heat alone, at a temperature on the order of about 150° to 250° C., or even as high as 300° C. In the alernative, heat plus a transesterification catalyst, such as magnesium silicate, may be employed. The pressure can be atmospheric or subatmospheric.

The proportions of the reactants should be such as to give a resulting mixture of aromatic polyester polyols which have an average OH (hydroxyl) number within the desired range of about 100 to 500. The saponification number of the DMT waste stream (a measure of transesterification sites) should be considered in selecting proportions. Preferably the approximate equivalents ratio of polyester polyol product from the first step to the polyalkylene glycol portion should be from 1:1 to 1:3. What actually forms the "polyol" of this invention is a mixture of polyols having ester functions, even though the mixture is sometimes referred to as a singular "polyol".

The polyol should have a hydroxyl number in the range of 100 to 500, with an especially preferred hydroxyl number range of 125 to 400. Unexpectedly, the resulting polyol mixture has a relatively low viscosity.

Polyurethane Foams

These mixtures can serve as polyol extenders when they are blended with conventional polyols for use in polyurethane foams. It is surprisingly that such good quality foams can be made even though these waste streams contain about 25% monofunctional materials. Polyfunctional materials are generally found necessary.

There is good compatibility of the polyols of this invention with trichlorofluoromethane. Trichlorofluoromethane, sold under the tradename FREON ®R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200-800. Usually the polyether polyol comprises 0-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ®R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination more preferably comprises 0-95 percent by weight of said polyether polyol and 100-5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures suggested contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are also made from DMT waste streams.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those described in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanate groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

EXAMPLE I

The Eastman methyl p-formylbenzoate waste stream had the following properties and characteristics according to the source indicated.

| Typical Composition (Eastman literature) | |
|---|---|
| MFB, % | 40–60 |
| p-methyltoluate | 20 |
| DMT | 18–25 |
| Methylbenzoate | 2 |
| p-Toluic acid | 15 |
| Found by Inventors (NMR Analysis) | |
| MFB, mole % | 56 |
| p-Methyltoluate | 10 |
| DMT | 20 |
| Methylbenzoate | 14 |
| p-Toluic acid | 0 |
| Found by Inventors (Wet Analysis) | |
| Saponification number | 436.89 |
| Acid number | 18.47 |
| Water, % | 0.31 |

EXAMPLE II

Aromatic Polyester Polyol Preparation

Interaction of Crude MFB with Methanolic Sodium Methoxide and Subsequent Transesterification with Glycol Residue A 500 ml, three-neck round bottom flask, equipped with a magnetic stirring bar, thermometer and water cooled condenser were charged with 64.0 g of solid crude Eastman MFB and 250 ml of anhydrous methanol. The solid was insoluble at room temperature, but soluble at 45°–50° C. The reaction solution was sampled at 50° C. (t=0) and then 7.3 g (33.78 mmoles) of 25% sodium methoxide in methanol added in several portions. No exotherm was observed, but the reaction solution changed color from yellow to golden yellow. The whole was heated to reflux (about 65° C.) and sampled at 2.0, 10.0, 18.0 and 26.0 hours (t=1, 2, 3, 4). Progress of the reaction was monitored by NMR analysis of the samples after methanol removal. The results are tabulated below.

| t | MFB | DMT | mole % p-Methyltoluate | Methylbenzoate | Area Ratio CHO |
|---|---|---|---|---|---|
| 0 | 65 | 14 | 8 | 13 | 6.6 |
| 1 | 59 | 16 | 10 | 15 | 10 |
| 2 | 52 | 17 | 14 | 17 | 9 |
| 3 | 18 | 54 | 13 | 15 | 32 |
| 4 | 25 | 50 | 11 | 14 | 23 |

The exact chemical transformations occurring are unclear, but it is thought that a modified Tishchenko reaction is operative, i.e.,

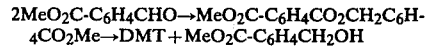

$2MeO_2C\text{-}C_6H_4CHO \rightarrow MeO_2C\text{-}C_6H_4CO_2CH_2C_6H_4CO_2Me \rightarrow DMT + MeO_2C\text{-}C_6H_4CH_2OH$ To the above reaction mixture, there were added 7.9 g (78.7 mmoles) of Magnesol 30/40 synthetic magnesium silicate (to neutralize sodium methoxide and to serve as transesterification catalyst) and 103.9 g (3.2 equivalents, basis saponification no. of crude MFB) of glycol residue (DEG, TEG, etc.; 860 OH No. and 1.65% $H_2O$). The whole was then stirred well and heated from room temperature to 240° C. max. pot temperature over a total of 4-5/20 hours (200°–240° C., 30 min). Overhead (methanol, water), 272 ml (214.0 g), was collected over 3.5 hours at 64°–124° C./70°–240° C. pot (760 mm) and discarded. The dark, mobile liquid polyol was recovered by filtration (hot, about 100° C.) of the pot residue through filter aid at aspirator pressure. The aromatic polyester polyol, which by NMR showed an area ratio of aromatic/CHO of 27, analyzed as follows:

| Hydroxyl number | 398 |
|---|---|
| Acid Number | 3.04 |
| Saponification Number | 149.66 |
| Water, % | 0.38 |
| Viscosity (25° C.), cs | 1,133 |

EXAMPLE III

Aromatic Polyester Polyol Preparation

Interaction of Crude MFB with Methanolic Aluminum Ethoxide and Subsequent Transesterification with Glycol Residue Reaction apparatus and conditions were as described in Example II.
Step 1 Charge:
  145.0 g solid crude MFB
  12.4 g (0.0765 mole) Al(OEt)$_3$
  570 ml anhydrous methanol
The heterogeneous reaction mixture was heated to reflux (about 65° C.) and held for 26 hours. NMR showed the proton area ratio of aromatic/CHO had changed from 6.6 to 8.3.
Step 2 Additional Charge:
  15.4 g (0.1534 mole) Magnesol 30/40 synthetic magnesium silicate
  235.4 g (3.2 equivalents) glycol residue
The mixture was heated from 25° to 240° C. max. pot over 6.0 hours (200°–240° C., 30 min.). Distillation gave an overhead, 524 ml (418 g) collected at 65.5°–94° C./70°–240° C. pot (760 mm) (Discarded).

The product aromatic polyester polyol, which showed no aldehyde protons by NMR, was isolated as before. The dark, mobile polyol analyzed as follows:

| | |
|---|---|
| Hydroxyl number | 327 |
| Acid number | 1.89 |
| Saponification number | 147.6 |
| Water, % | 0.05 |
| Viscosity (25° C.), cs | 3,871 |

Fire Retarded Rigid Polyurethane Foams

The experimental aromatic polyester polyols were used as extender polyols in THANOL ®R-350-X and THANOL R-650-X formulations. THANOL R-350-X and THANOL R-650-X polyols are sold by Texaco Chemical Co. and are described in U.S. Pat. No. 3,297,597 and 4,137,265. Comparative examples with the extender TERATE ® 203 (Hercules) are also presented.

Formulation components were mixed at 2700 rpm and poured into open molds and allowed to rise. Foams were submitted for physical properties after standing at room temperature for at least three days. Formulations and physical property data are as follows.

EXAMPLE IV

THANOL-R-350-X Cases

| | A | B | C | D |
|---|---|---|---|---|
| Formulation, pbw | | | | |
| THANOL R-350-X, (OH = 534) | 33.8 | 24.8 | 25.4 | 25.5 |
| Polyol, Ex. II (OH = 398) | — | 10.6 | — | — |
| Polyol, Ex. III (OH = 327) | — | — | 10.9 | — |
| TERATE 203[1] (OH = 318) | — | — | — | 10.9 |
| FYROL PCF[2] | 5.0 | 5.0 | 5.0 | 5.0 |
| Water | 0.3 | 0.3 | 0.3 | 0.3 |
| FREON R-11B[3] | 13.0 | 13.0 | 13.0 | 13.0 |
| L-5420[4] | 0.5 | 0.5 | 0.5 | 0.5 |
| FOMREZ UL-32[5] | 0.01 | 0.01 | 0.01 | 0.01 |
| MONDUR MR[6] (index = 1.10) | 47.4 | 45.8 | 44.9 | 44.8 |
| Time, seconds, mixing | 10 | 7 | 9 | 10 |
| Time, seconds, cream | 26 | 15 | 19 | 15 |
| Time, seconds, gel | 66 | 52 | 65 | 57 |
| Time, seconds, tack free | 98 | 80 | 102 | 83 |
| Time, seconds, rise | 105 | 101 | 120 | 115 |
| Initial surface friability | None | None | None | None |
| Foam appearance | Good | Good | Good | Good |
| Foam Physical Properties | | | | |
| Density, lbs/ft$^3$ | 1.87 | 1.71 | 1.69 | 1.68 |
| K-factor | 0.118 | — | 0.125 | 0.110 |
| Compression strength, psi | | | | |
| with rise | 41.44 | 30.13 | 36.92 | 37.13 |
| against rise | 19.26 | 15.83 | 15.00 | 12.69 |
| Heat distortion, °C. | 152 | 114 | 117 | 129 |
| Closed cells, % | 91.79 | 90.21 | 90.97 | 93.64 |
| Friability, wt. loss, %, 10 minutes | 8.18 | 1.67 | 3.85 | 2.35 |
| ASTM 1692 Burn, in/min, BHA | 2.49 | — | 2.16 | 2.08 |
| Butler Chimney Test | | | | |
| Flame height, inches | >11 | — | >11 | >11 |
| Seconds to extinguish | 19.0 | — | 22.0 | 14.0 |
| Wt. % retained | 59.7 | — | — | 78.2 |

[1]A DMT resin modified with a glycol, sold by Hercules, Inc., described in U.S. Pat. Nos. 4,237,238 and 3,647,759
[2]Fire retardant sold by Stauffer Chemical Co.
[3]Trichlorofluoromethane
[4]A silicone surfactant sold by Union Carbide Corp.
[5]A tin catalyst sold by Witco Chemical Corp.
[6]A polymeric isocyanate sold by Mobay Chemical Corp.

EXAMPLE V

THANOL R-650-X-Cases

| | E | F | G | H |
|---|---|---|---|---|
| Formulation, pbw | | | | |
| THANOL R-650-X, (OH = 455) | 37.0 | 26.5 | 27.2 | 27.2 |
| Polyol, Ex. II (OH = 398) | — | 11.3 | — | — |
| Polyol, Ex. III (OH = 327) | — | — | 11.6 | — |
| TERATE 203 (OH = 318) | — | — | — | 11.7 |
| FYROL PCF | 5.0 | 5.0 | 5.0 | 5.0 |
| Water | 0.3 | 0.3 | 0.3 | 0.3 |
| FREON R-11B | 13.0 | 13.0 | 13.0 | 13.0 |
| L-5420 | 0.5 | 0.5 | 0.5 | 0.5 |
| FOMREZ UL-32 | 0.01 | 0.01 | 0.01 | 0.01 |
| MONDUR MR (index = 1.10) | 44.2 | 43.4 | 42.4 | 42.3 |
| Time, seconds, mixing | 8 | 7 | 8 | 10 |
| Time, seconds, cream | 12 | 13 | 16 | 12 |
| Time, seconds, gel | 51 | 40 | 50 | 50 |
| Time, seconds, tack free | 64 | 61 | 71 | 60 |
| Time, seconds, rise | 109 | 93 | 90 | 84 |
| Initial surface friability | None | None | None | None |
| Foam appearance | Good | Good | Good | Good |
| Foam Physical Properties | | | | |
| Density, lbs/ft$^3$ | 1.74 | 1.85 | 1.75 | 1.78 |
| K-factor | 0.118 | — | 0.119 | 0.113 |
| Compression strength, psi | | | | |
| with rise | 35.94 | 33.94 | 38.90 | 35.08 |
| against rise | 14.32 | 14.99 | 13.55 | 12.58 |
| Heat distortion, °C. | 137 | 108 | 106 | 138 |
| Closed cells, % | 92.02 | 92.61 | 92.36 | 94.86 |
| Friability, wt. loss, %, 10 minutes | 6.19 | 1.58 | 3.85 | 2.37 |
| ASTM 1692 Burn, in/min, BHA | 2.97 | — | 2.19 | 2.36 |
| Butler Chimney Test | | | | |
| Flame height, inches | >11 | — | >11 | 9.0 |
| Seconds to extinguish | 14.0 | — | 12.0 | 12.3 |
| Wt. % retained | 53.9 | — | 60.2 | 79.0 |

It may be readily seen from many of the examples that the polyol mixtures of this invention work as well as polyol extenders as do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol mixtures that give foams with optimal properties.

I claim:

1. A mixture of aromatic polyols having hydroxyl and ester functionalities for use in preparing rigid foams, being produced by the process comprising
   (a) reacting a dimethyl terephthalate waste stream which contains from about 40 to 60 mole percent of methyl p-formylbenzoate over a metal alkoxide catalyst and (b) subsequently transesterifying the product from step (a) with a polyalkylene glycol by applying heat in the range from about 150° to 250° C.

2. The mixture of aromatic polyols of claim 1 in which the dimethyl terephthalate production waste stream also contains one or more of the compounds from the group consisting of dimethyl terephthalate, p-methyltoluate, methylbenzoate and p-toluic acid.

3. The mixture of aromatic polyols of claim 1 in which the metal in the metal alkoxide catalyst is selected from Groups IA and IIIA of the Periodic Table.

4. The mixture of aromatic polyols of claim 1 in which the metal alkoxide catalyst is dissolved or suspended in methanol and is selected from the group consisting of sodium alkoxide and aluminum alkoxide where the alkyl group present therein has from one to four carbon atoms.

5. The mixture of aromatic polyols of claim 1 in which the catalyst concentration in step (a) ranges from 1 to 10 weight percent.

6. The mixture of aromatic polyols of claim 1 in which the alkylene glycol has the formula

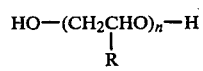

where R is hydrogen or lower alkyl of 1 to 4 carbon atoms and n is from 1 to 10.

7. The mixture of polyols of claim 1 in which the alkylene glycol is a glycol waste stream.

8. The mixture of polyols of claim 1 in which the reactions are conducted at a temperature between about 25° to 250° C. and at a pressure between one atmosphere and subatmospheric.

9. The mixture of polyols of claim 1 in which the average hydroxyl number of the resultant mixture is between about 100 and 500.

10. The mixture of aromatic polyols of claim 1 in which the amount of alkylene glycol employed is 1–5 equivalents based on the dimethyl terephthalate waste stream.

11. A mixture of aromatic polyols having hydroxyl and ester functionalities for use in preparing rigid foams, being produced by the process comprising
(a) reacting a waste stream from the manufacture of dimethyl terephthalate which contains dimethyl terephthalate and from about 40 to 60 mole percent of methyl p-formylbenzoate over a catalyst selected from the group consisting of sodium alkoxide and aluminum alkoxide where the alkyl group is from one to four carbon atoms and
(b) subsequently transesterifying the product from step (a) with an alkylene glycol residue containing one or more alkylene glycols having the formula

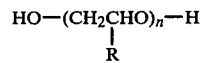

where R is hydrogen or lower alkyl of 1 to 4 carbon atoms and n is from 1 to 10, by heating the mixture at a temperature in the range from about 150° to 250° C.

12. The mixture of aromatic polyols of claim 11 in which the catalyst concentration in step (a) ranges from 1 to 10 weight percent.

13. The mixture of polyols of claim 11 in which the reactions are conducted at a temperature between about 25° to 250° C. and at a pressure between one atmosphere and subatmospheric.

14. The mixture of polyols of claim 11 in which the average hydroxyl number of the resultant mixture is between about 100 and 500.

15. The mixture of aromatic polyols of claim 11 in which the amount of alkylene glycol employed is 1–5 equivalents based on the dimethyl terephthalate waste stream.

16. A method for making a mixture of aromatic polyols having hydroxyl and ester functionalities for use in preparing rigid foams comprising
(a) reacting a dimethyl terephthalate waste stream which contains from 40 to 60 mole percent of methyl p-formylbenzoate over a metal alkoxide catalyst and
(b) subsequently transesterifying the product from step (a) with a polyalkylene glycol by heating the mixture to a temperature between about 150° and 250° C.

17. The method of claim 16 in which
(a) the metal alkoxide catalyst is selected from the group consisting of sodium alkoxide and aluminum alkoxide where the alkyl group has from one to four carbon atoms, and
(b) the alkylene glycol is an alkylene glycol residue having at least one alkylene glycol with the formula

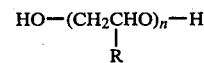

where R is hydrogen or lower alkyl of 1 to 4 carbon atoms and n is from 1 to 10 carbon atoms.

18. A rigid polyurethane foam obtained by reacting in the presence of a blowing agent and a catalyst of polyurethane formation, an organic polyisocyanate and a polyol blend comprising
(a) from about 5 to 100 percent by weight of a mixture of aromatic polyols having ester functionalities which is the reaction product from
(1) reacting a dimethyl terephthalate waste stream which contains from about 40 to 60 mole percent of methyl p-formylbenzoate over a metal alkoxide catalyst and
(2) subsequently transesterifying the product from step (1) with a polyalkylene glycol by applying heat in the range from about 150° to 250° C., and
(b) from about 95 to 0 percent by weight of a nitrogen-containing polyol which is the reaction product from
(1) reacting one mole of phenol or nonylphenol with one to two moles of diethanolamine and formaldehyde to give a Mannich reaction product, and
(2) subsequently reacting one mole of the Mannich reaction product with 2 to 3 moles of propylene oxide.

19. The rigid polyurethane foam of claim 18 in which the polyol blend has an average hydroxyl number in the range from 100 to 500.

* * * * *